US005493487A

United States Patent [19]
Close et al.

[11] Patent Number: 5,493,487
[45] Date of Patent: *Feb. 20, 1996

[54] ELECTRONIC SWITCHING CIRCUIT

[75] Inventors: Eric C. Close, Valley Forge; Jerry K. Goff, Doylestown, both of Pa.

[73] Assignee: Performance Controls, Inc., Horsham, Pa.

[*] Notice: The portion of this term of this patent shall not extend beyond the expiration date of Pat. No. 5,379,209

[21] Appl. No.: 162,227

[22] Filed: Dec. 6, 1993

Related U.S. Application Data

[63] Continuation-in-part of Ser. No. 15,531, Feb. 9, 1993, Pat. No. 5,379,209.
[51] Int. Cl.⁶ .......................... H02M 7/5387; H02P 5/00
[52] U.S. Cl. .............................. 363/132; 363/41; 363/98; 318/599; 388/907.2
[58] Field of Search ........................ 363/41, 58, 98, 363/123, 132, 136; 318/599, 811; 388/811, 907.2

[56]  References Cited

U.S. PATENT DOCUMENTS

| 4,545,004 | 10/1985 | Kade et al. | 363/63 |
| 4,894,621 | 1/1990 | Koenig et al. | 330/251 |
| 5,025,360 | 6/1991 | Latos | 363/16 |
| 5,070,292 | 12/1991 | Goff | 318/811 |
| 5,081,409 | 1/1992 | Goff | 318/811 |
| 5,111,381 | 5/1992 | Pigott et al. | 363/132 |
| 5,262,932 | 11/1993 | Stanley | 363/26 |
| 5,379,209 | 1/1995 | Goff | 363/132 |

Primary Examiner—Peter S. Wong
Assistant Examiner—Adolf Berhane
Attorney, Agent, or Firm—William H. Eilberg

[57]  ABSTRACT

A pulse-width modulated (PWM) circuit provides current through a load by opening and closing main electronic switches which connect the load to a power supply. Each main electronic switch connects with an auxiliary switch, connected in series with a diode, the auxiliary switch and diode being called "recovery paths". The recovery paths provide a path between the load and the associated main switch, on one side, and the power supply on the other. A first train of pulses, derived from a command signal, drives the main switches, and a second train of pulses, derived from the first pulse train, controls the switches in the recovery paths. One arranges the second train such that the recovery paths carry current only while the main switches change from on to off, or from off to on. In this way, the recovery paths carry part of the current that would otherwise flow transiently through the main switches, due to the inherent inefficiencies in semiconductor switching. Therefore, the present invention allows the main switches to increase in efficiency as compared with circuits of the prior art. In an alternative embodiment, the recovery path includes the load but excludes the power supply, so that current can flow only transiently through the recovery path. The latter embodiment requires fewer switches than the previous embodiment, and is therefore less costly.

12 Claims, 8 Drawing Sheets

ELECTRONIC SWITCHING CIRCUIT

CROSS-REFERENCE TO PRIOR APPLICATION

This is a continuation-in-part of application Ser. No. 08/015,531, filed Feb. 9, 1993 U.S. Pat. No. 5,379,209, entitled "Electronic Switching Circuit".

BACKGROUND OF THE INVENTION

This invention relates to the field of electronic switching. In particular, the invention provides an improvement in a pulse-width modulated circuit for driving a load, such as an electric motor.

The prior art includes many examples of pulse-width modulation (PWM) as a means of controlling the current through a load. For example, U.S. Pat. Nos. 5,070,292 and 5,081,409 describe such PWM circuits. This specification incorporates by reference the disclosures of the latter patents. In these patents, and in similar PWM circuits of the prior art, a stream of pulses controls electronic switches which open and close different circuit paths for applying current to the load. The widths of the pulses determine when, and in what direction, the circuit applies current to the load. Thus, the pulse widths directly control the effective current in the load.

This invention addresses the problem caused by the fact that electronic switches and diodes do not change states instantaneously. Most theoretical discussions of PWM ignore the transient behavior of electronic switches, but these transient effects cause losses and reduce the efficiency of the PWM system.

Switching losses comprise power losses incurred by the electronic switch as it turns on or off. The power loss becomes dissipated in the switch in the form of heat. The present invention has as its major object the reduction of such switching losses.

The "reverse recovery" effect forms a significant component of switching losses in an electronic switch. A semiconductor diode presents a low electrical resistance to current flowing in one direction (the "forward direction") and a high resistance to current flowing in the opposite direction (the "reverse direction"). One intends that current should flow substantially unimpeded in the forward direction, and that virtually no current should flow in the reverse direction. Although the latter statements hold true for the steady-state condition, these statements do not describe what happens in the very short term. It turns out that when one forward-biases the diode and then changes the applied voltage so as to reverse-bias the diode, current through the diode does not immediately cease. In fact, for a short time after the biasing has reversed, current actually flows in the opposite direction, and with little resistance. The magnitude of this reverse current approximately equals the magnitude of the current that flowed in the forward direction, as the reverse current momentarily "sees" virtually no resistance. As time passes, however, the reverse current rapidly diminishes, until the reverse-biased diode reaches a state wherein virtually no current passes through it. This reverse current diminishes in magnitude very quickly, and normally has little effect on the operation of an electronic circuit. However, in applications where one must perform rapid and repeated switching, the effect can have serious consequences. The reverse recovery effect varies according to the design of the diode; some diode designs can substantially reduce the amount of reverse current. In general, one observes the reverse recovery effect when one switches a diode from forward biasing to reverse biasing.

Another practical problem arises from the inherent properties of semiconductor switching devices such as field-effect transistors (FETs). The source and drain of a FET together inherently function as a diode and a FET in parallel. One can draw the equivalent circuit for a MOSFET as a MOSFET connected in parallel with a diode. One calls this unintended diode a "parasitic diode", because the diode forms part of every FET, due to the inherent construction of the FET. Unfortunately, such parasitic diodes normally have very poor reverse recovery effects. By "poor" one means that the parasitic diode of a FET passes a reverse current having a large magnitude and/or allows that current to flow for a relatively long time, and that the current does not turn off smoothly when it finally does turn off. The latter behavior of a diode is analogous to the phenomenon of "water bang" observed in a household plumbing system. When a water faucet is shut off rapidly, the entire column of water constrained to the pipe must stop abruptly, causing the pipes to jerk suddenly to dissipate the energy stored in the moving water. The latter effect may eventually result in damage to the plumbing system. Analogous stresses develop in the above-described electrical circuit due to the sudden commutation of the internal diode.

Thus, the relatively poor internal diodes reduce the efficiency of a high-speed switching circuit. This is because the unwanted current flows while the switch is operated in the "linear region" wherein voltage is still dropping across it while current is flowing, resulting in high power dissipation.

Figure 1:
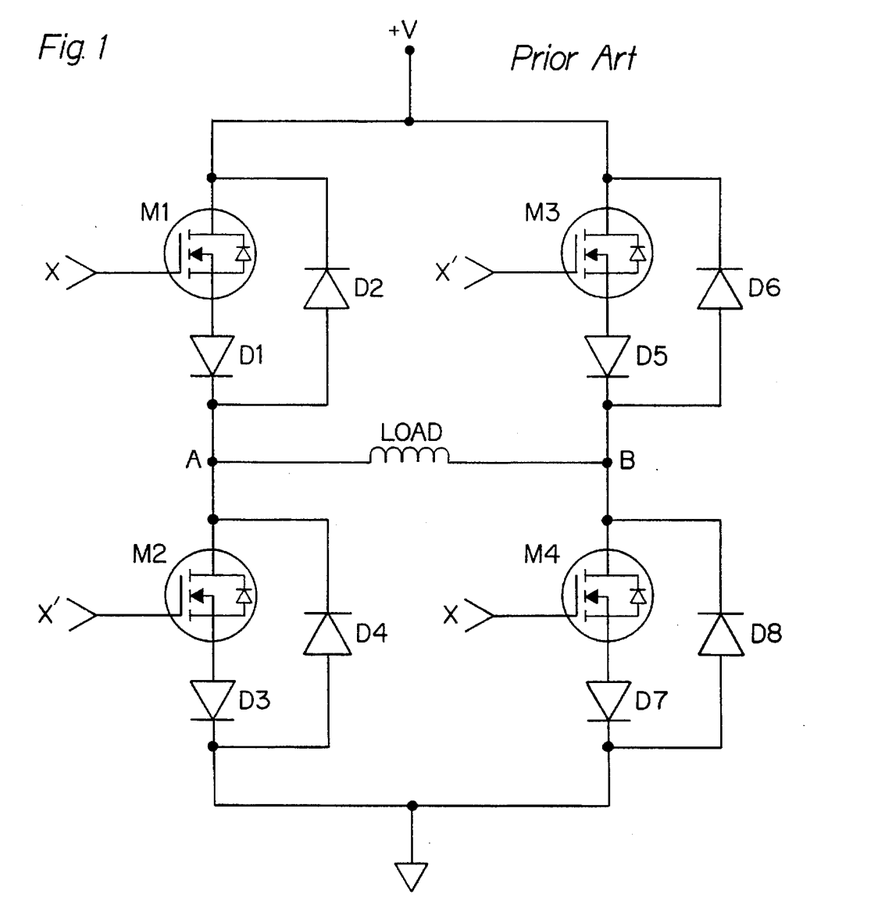
FIG. 1 shows a switching circuit of the prior art, having the form of an H-bridge driven by a PWM signal, for applying a current to a load.

FIG. 1 illustrates a typical circuit of the prior art. This circuit constitutes an "H-bridge", formed of four switches M1, M2, M3, and M4. Each switch includes a FET, as well as two diodes, one in series with the FET and the other in parallel with the combination of the FET and the series diode. The FETs also explicitly show the parasitic diodes inherent in each FET. These parasitic diodes do not comprise separate components, but appear in the figure for emphasis. Diodes D2, D4, D6, and D8 provide alternative paths for current instead of through the parasitic diodes; in practice, one chooses D2, D4, D6, and D8 to have better turn on and/or turn off characteristics than those of the parasitic diodes. Note that the reverse recovery characteristic forms part of the turn off characteristic of the diode.

A power supply (not shown) supplies voltage +V, and the current flows back to the power supply through the ground connection shown.

Figure 2:
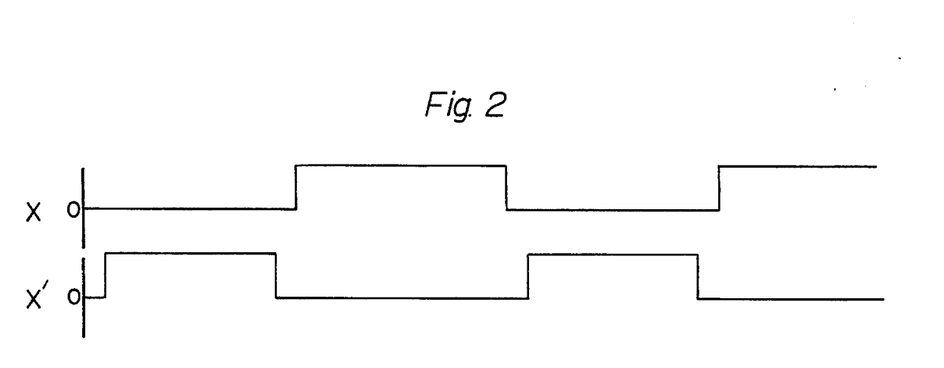
FIG. 2 shows a diagram of the PWM signals used to drive the switches of FIG. 1, and also includes a diagram showing the current through the load.

One applies a PWM signal, shown in the pulse diagram of FIG. 2, to the switches M1, M2, M3, and M4, shown in FIG. 1. In particular, the basic PWM signal x controls switches M1 and M4, while the complemented PWM signal (x') controls switches M2 and M3. In practice, signal x' does not exactly represent the complement of PWM; instead, x' becomes high shortly after x becomes low, and x' becomes low shortly before x becomes high. The latter arrangement prevents temporary short circuits across the power supply, which would occur, for example, with both M1 and M2, or M3 and M4, in the conductive state. FIG. 2 shows this "dead time" between x and x' pulses in an exaggerated manner.

Now assume that current flows through the load from left to right; one can call this direction the positive direction. Suppose that x has reached its high state. Then M1 and M4 conduct, and current flows from the power supply (+V), through M1 and D1, through the load, through M4 and D7, and back to the power supply via ground. At this moment, the voltage at point A approximately equals +V, and the voltage at B approximately equals ground. Thus the voltage applied across the load ($V_A-V_B$) equals about +V volts. Due to the inductive nature of the load, we can say that (di/dt): V/L, where i represents the current through the load and L represents the inductance of the load. Thus, the current increases in magnitude, in the positive direction, at the approximate rate of V/L.

Next, consider what happens when x first becomes low. At this moment, x' initially remains low, as explained above. For an inductive load, current continues to flow through the load, as it cannot change instantaneously. For very short time periods, one can consider the load as a constant current source, due to the tendency of the inductor to resist change in its magnetic field. M1 and M4 take a finite amount of time to turn off. As M1 and M4 turn off, they become more resistive as time passes. Since the current remains nearly constant during this short time period, the more resistive M1 and M4 become, the greater the voltage drop across M1 and M4, until the voltage at point A becomes less than ground and the voltage at point B becomes greater than +V. At this time, D4 and D6 become forward-biased and the load current now flows from ground, through D4, through the load, through D6, and to the power supply (+V). Current will not flow through M2 or M3 because diodes D5 and D3 block current flow from source to drain through the FETs.

The magnitude of the current flowing through the load decreases because one has effectively applied the negative of the voltage formerly applied to the load (note that point A represents ground potential when D4 conducts, so the power supply voltage +V appears at the side of the load near point B). The rate at which the current decreases approximately equals (di/dt)=($V_A-V_B$)/L=–(+V)/L.

When x' becomes high, the FETs associated with M2 and M3 conduct, but due to D3 and D5, current continues to flow in the direction indicated above, through D4, the load, and D6. Similarly, when x' becomes low, current continues to flow in the same manner.

Next, as x becomes high again, the FETs associated with M1 and M4 begin to turn on. As they turn on, they become less resistive. In becoming less resistive, they begin to conduct more and more current. They will continue to conduct increasing amounts of load current until the switches carry the full load current. At this time, D4 and D6 become reverse-biased. The power supply now becomes momentarily short-circuited, because current can flow through M1 and D1, and then through D4 (during the reverse recovery time for this diode). A similar short circuit occurs through D6, M4, and D7, because of the reverse recovery current of D6. Note that M1 and M4 carry the respective reverse recovery currents (of D4 and D6, respectively) plus the load current. As the reverse recovery currents in D4 and D6 decrease to zero, the current flowing through M1 and M4 becomes the load current only.

One can explain the switching losses in the H-bridge circuit of FIG. 1 in the following manner. When x goes low, M1 and M4 begin to turn off, and as they turn off they become more resistive. At the same time, the current through M1 and M4 does not change. The latter facts translate into excess power losses. The power loss equals the voltage across the device turning off multiplied by the current flowing through the device.

Similarly, one experiences a switching loss when M1 and M4 turn on. As M1 and M4 turn on, they become less resistive. In becoming less resistive, they begin to draw increased amounts of current. They will continue to draw increasing amounts of current until the switch conducts the full load current. At this time, D4 stops conducting and becomes reverse-biased, causing a reverse recovery current spike. This current spike flows through M1 and M4 in addition to the load current. The switching power loss in the FETs equal the voltage across the device turning off multiplied by the current flow through the device.

A similar analysis applies in the case where current flows through the load in the negative direction (from point B to point A). In this case, the dominant current path (which occurs when M2 and M3 conduct, when x' becomes high) comprises M3, D5, the load, M2, and D3, and the path of current when all FETs cease to conduct (and also when M1 and M4 are turned on) would include D8, the load, and D2. Similar switching losses occur when the switches change state, for the same reasons given in the case of positive current flow.

The invention disclosed in U.S. patent application Ser. No. 08/015,531, cited above, reduces the switching losses in a PWM switching device. The disclosure of the latter application is hereby incorporated by reference. The present invention provides further improvements over the circuit disclosed in application Ser. No. 08/015,531.

SUMMARY OF THE INVENTION

The present invention provides a PWM switching system which has, for each main switch in the system, an auxiliary switch, connected between the principal switch, through a diode, to the power supply. A separate pulse train, different from the PWM pulses but derived therefrom, controls the auxiliary switch. During the times when one expects to experience the switching losses described above, the auxiliary switch provides an alternative current path, diverting current from the main switch, and reducing the switching losses experienced by the main switch. This auxiliary switch can be a relatively small, high-speed, controlled diode, which thus reduces unwanted currents through the main switches, and which is unlikely to discharge through its "linear region" in which the potential for power loss is greatest.

In one embodiment, the invention takes the form of an H-bridge, similar to that of FIG. 1, but having auxiliary switches connected to all four of the main switches. In this case, only two of the auxiliary switches serve their purpose of carrying current at one time. The direction of current flow through the load determines which pair of auxiliary switches actually carries current at any moment.

In another embodiment, one can use the invention with three-phase current. In this case, the load includes three parts, each part connected to a pair of main switches. As before, auxiliary switches connect to those main switches, for the same purpose described above. One can also generalize the invention to the case of an N-phase current, where N is a positive integer.

In still another embodiment, there are only two auxiliary switches. In this case, the alternative current path does not include the power supply. Instead, current flows in a path which includes the load, the auxiliary switches, and two diodes. Current flows momentarily in the recovery path, due to the energy stored in the inductive load. This embodiment has the advantage that it reduces the number of switches and therefore reduces the cost of the circuit. It also reduces the level of switching losses.

The present invention therefore has the primary object of improving the efficiency of a PWM switching system for applying current to a load.

The invention has the further object of increasing the amount of peak current carrying capacity of a PWM switching system.

The invention has the further object of reducing switching losses in general, and of reducing losses caused by the reverse recovery effect of semiconductor diodes.

The invention has the further object of reducing the number of high-power components required in a PWM switching system, and thereby reducing the cost of such a system.

The person of ordinary skill will recognize other objects and advantages of the invention, from a reading of the following brief description of the drawings, the detailed description of the invention, and the appended claims.

DETAILED DESCRIPTION OF THE INVENTION

Figure 3:
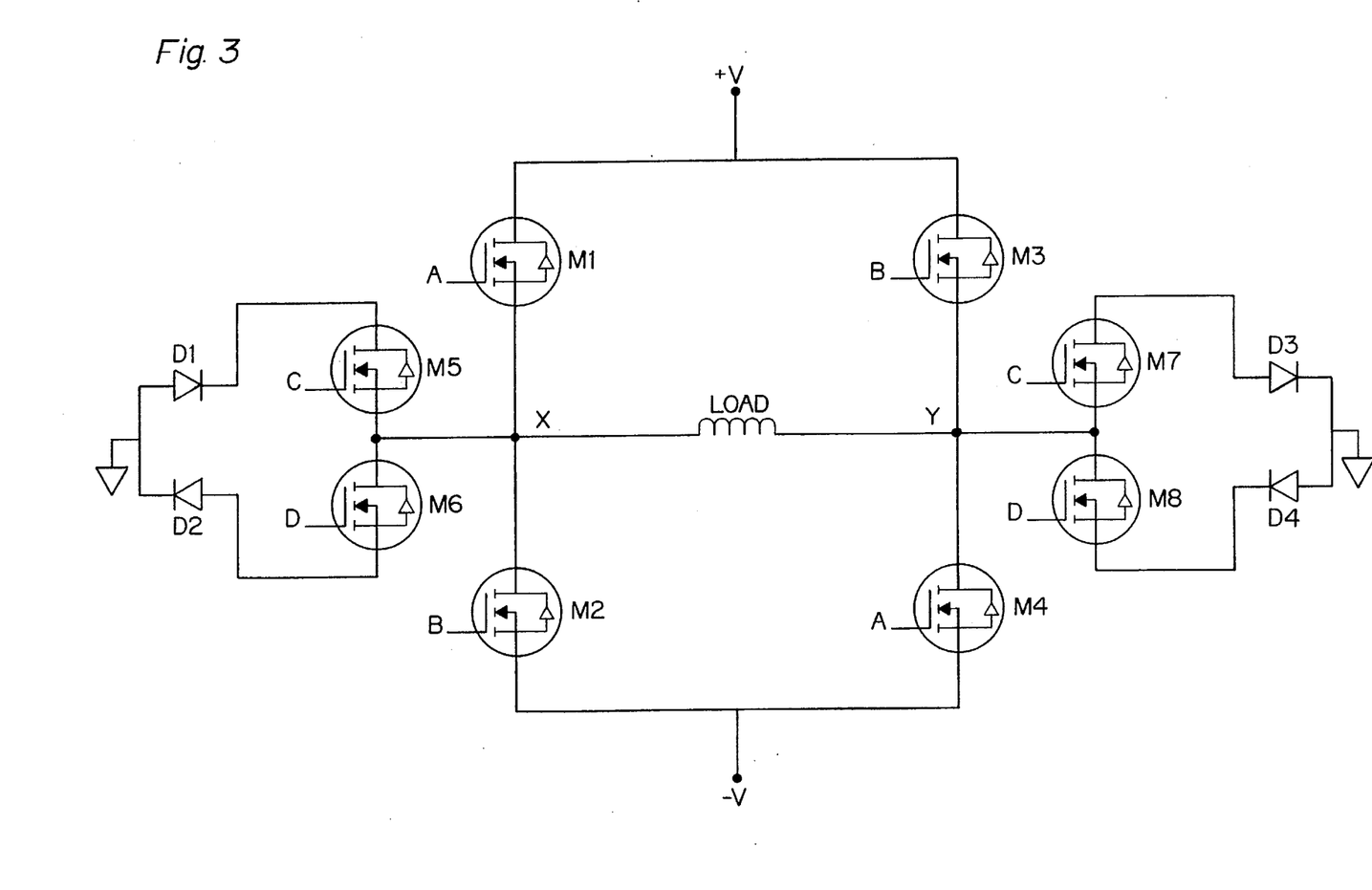
FIG. 3 shows a schematic diagram of a circuit made according to the present invention.
Figure 4:
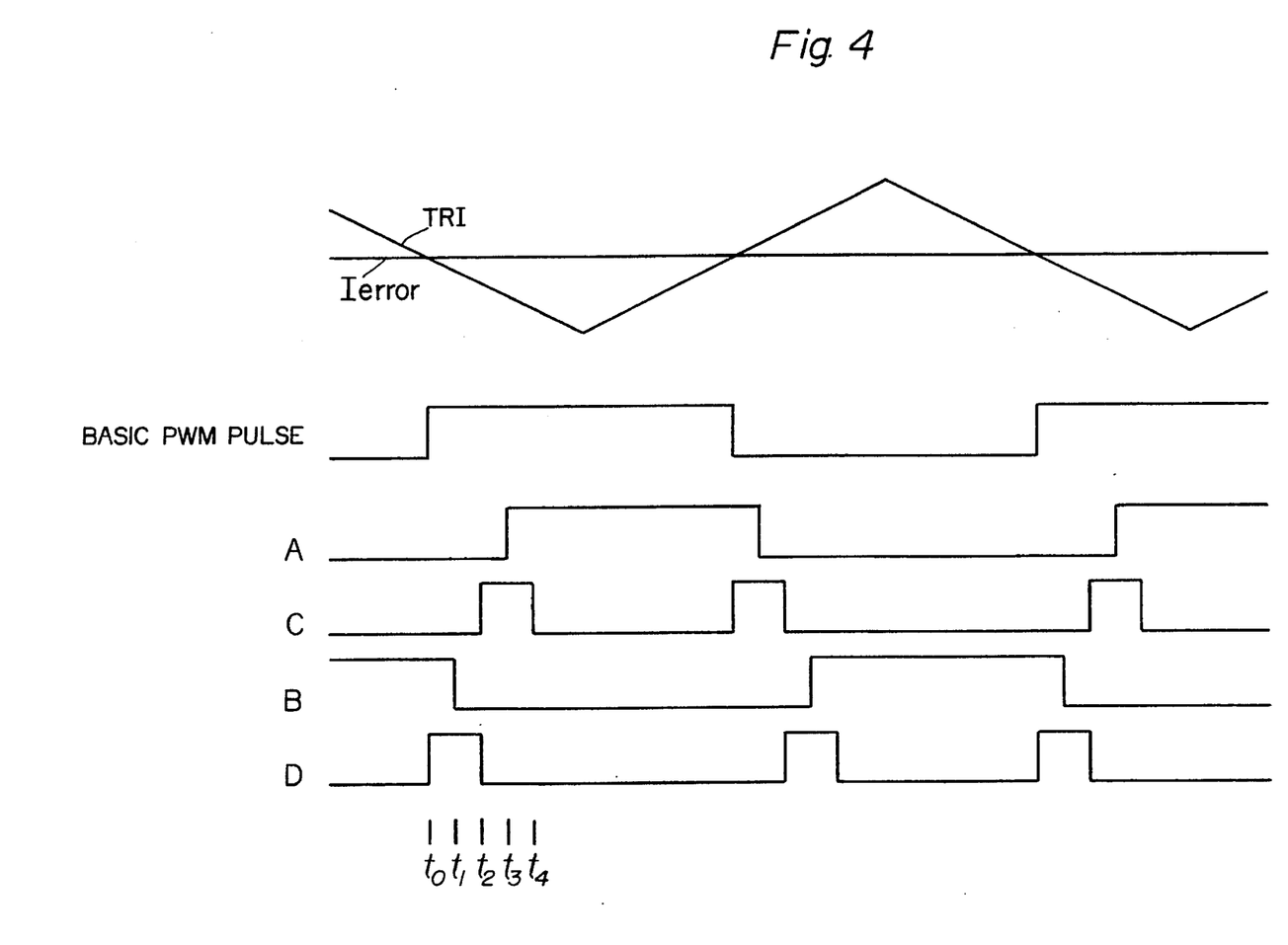
FIG. 4 contains diagrams of the pulses which drive the circuit elements of FIG. 3, and shows how one obtains those pulses from a basic PWM pulse.

FIGS. 3 and 4 illustrate one embodiment of the present invention. In FIG. 3, switches M1, M2, M3, and M4 correspond to the similarly-labeled switches of FIG. 1. One normally desires to omit the diodes in series with, and in parallel with, each FET, but one could include such diodes in FIG. 3. In FIG. 3, switches M5, M6, M7, and M8, and diodes D1, D2, D3, and D4, represent components added by the present invention, and which have no counterpart in FIG. 1.

FIG. 4 contains diagrams showing the pulses applied to the various switches in the circuit of FIG. 3. Pulse train A controls switch M1 and M4, and pulse train B controls switches M2 and M3. Pulse train C controls switches M5 and M7, and pulse train D controls switches M6 and M8. A more detailed description of the derivation of the pulse trains will appear later.

In the following description of the operation of the circuit of the present invention, one first assumes that current flows through the load from left to right, as shown in FIG. 3. One calls this direction the "positive" direction.

Suppose now that signal A has just become high. At this point, B and D are low, and C is high. Current therefore flows from the +V side of the power supply, through switch M1, through the load, through switch M4, and back to the −V side of the power supply. Note that the power supply in the circuit of FIG. 3 includes two separate power supplies, which together provide a maximum voltage difference of 2 V. Due to the status of signal C, switches M5 and M7 are turned on, but no current flows through M5 and M7 because diodes D1 and D3 are reverse biased. Note that, at this point, the status of signal C has no effect; the current path remains unaffected when C becomes low and when it again becomes high, while A remains high.

Now consider what happens when A becomes low. At this point, FIG. 4 shows that B remains low, and C remains high. Again assuming an inductive load, as A becomes low, M1 and M4 become more resistive. Current continues to flow through M1, the load, and M4, until the voltage at nodes X and Y equal ground. M5 and M7 are already on, and node X is diode-clamped to ground, preventing the voltage from going below ground, and node Y is diode-clamped to ground, preventing the voltage from going above ground. Thus, current then travels from ground, through D1, through M5, through the load, through M7, through D3, and back to ground. M1 and M4 then cease conducting current.

In the corresponding situation in the prior art arrangement of FIG. 1, the current would follow a path from the power supply ground, through D4, through the load, through D6, and to the power supply (+V).

The next change in the pulse configuration occurs when C becomes low and D becomes high. As C turns off, M5 and M7 become more resistive, inducing a voltage across themselves. This process continues until the voltage at point X drops to −V, allowing current to flow through the parasitic diode of M2, while the voltage at point Y increases to +V, allowing current to flow through the parasitic diode of M3. Thus, current flows in a path which includes switch M2, the load, and switch M3, the current flowing through the parasitic diodes of these switches. Current will not flow through M6 or M8 because D2 and D4 are reverse-biased.

The next change in the pulse configuration occurs when B becomes high. This change in pulse states leaves the current path unaffected, since current continues to flow from −V through M2, through the load, through M3, and back to the power supply (+V).

Next, D becomes low. No change in current path occurs; current continues to flow from the power supply, through M2, through the load, through M3, and back to the power supply.

Next, D becomes high. But again, this change in pulse state causes no change in the current path, because D2 and D4 are reverse-biased, and no current flows through them. Thus, current continues to flow through M2, the load, and M3, as before.

Next, B becomes low. Current flows in the same path as in the previous case, namely, from the power supply, through M2, through the load, through M3, and back to the power supply. In this case, the current flows through the parasitic diodes of M2 and M3.

Next, D becomes low and C becomes high. At this point, load current begins to flow through D1, M5, the load, M7, and D3. The parasitic diodes of M2 and M3 become reverse-biased and causes a reverse recovery pulse to flow through D1, M5, and M2, in addition to M3, M7 and D3. After the parasitic diodes of M2 and M3 fully recover, current flows from ground and through D1, M5, the load, M7, D3, and back to ground.

Finally, A becomes high again. M1 and M4 begin to conduct increasing amounts of load current until all the load current flows through M1 and M4. D1 and D3 become reverse-biased and cause a reverse recovery pulse to flow through M1, M5, and D1, and M4, M7, and D3. After D1 and D3 fully recover, current flows from +V, through M1, the load, M4, and to −V, and the cycle begins again.

For convenience of discussion, one calls switches M1, M2, M3, and M4 the "main" FETs, and one calls the circuit which includes D1, M5, the load, D3, and M7 (or the circuit including D2, M6, the load, D4, and M8) the "recovery paths". The recovery paths include the auxiliary switches. Also, the term "dead time" means the interval during which both A and B assume the low state. Thus, when increasingly positive current flows through the load, the dominant current flow occurs through a pair of main FETs, namely M1 and M4. During one-half of the dead time, current flows through one of the recovery paths (for positive current flow, current flows through the recovery path which includes D1, M5, the load, M7, and D3). For the other half of the dead time, current flows through the parasitic (or external) diode associated with the other two main FETs (M2 and M3, for positive current flow).

For negative current flow through the load, the pulse diagram remains the same. For either increasingly positive or negative current flow, the relative widths of the pulses of signals A and B may become different. These relative widths determine whether the circuit will seek to move current through the load in a positive or a negative direction. When current flows through the load increasingly in the negative direction, the dominant current flow occurs through the path including M3, the load, and M2, and occurs when B assumes the high state. Current flows through the recovery path defined by D2, M6, the load, D4, and M8, for part of the dead time, when signal D assumes the high state. In the case of negative current flow through the load, the status of C has no effect.

For both positive and negative current flow through the load, note that the switches in the recovery paths switch only one-half of the total bus voltage (one-half of 2 V). Thus, for M5, M6, M7, M8, one can choose lower voltage FETs than the FETs used for M1, M2, M3, and M4, because the former FETs will be exposed to only one-half the voltage exposed to the main FETs. Preferably, one chooses D1, D2, D3, and D4 to have desirable turn on and/or turn off characteristics, so that these diodes impart only small switching losses on the devices that must conduct the reverse recovery current.

The present invention has the following advantages over the prior art:

a) The present invention reduces the switching losses incurred by the main FETs as compared to the prior art. The voltage transiently switched by the main FETs is always half that of the prior art. In addition, the magnitude of reverse recovery current ever conducted through the main FETs is substantially less than what is experienced in the prior art. These benefits translate into a considerable reduction in switching power losses.

b) The present invention reduces switching losses by a factor greater than 2. The voltage across the main FETs during turn on and turn off is reduced by a factor of 2, since every FET must switch only one-half the bus voltage at any one time. The latter fact means that the invention reduces the switching power loss by a factor of 2, since the switching power loss varies directly with the voltage across the switch.

c) The present invention eliminates the series diodes used in the prior art (D1, D3, D5, and D7 of FIG. 1), thus reducing the on-state losses experienced in the prior art.

d) The present invention eliminates the need for the parallel diodes (D2, D4, D6, and D8 of FIG. 1) since the invention uses the parasitic diodes already present with the FETs.

e) The present invention dissipates most switching losses in the auxiliary FETs, thus extending the safe operating area of the main FETs.

f) The present invention reduces the physical space required by the circuit, as compared with the prior art circuit of FIG. 1, for comparable power levels.

The following explains the derivation of the pulse trains A, B, C, and D. First, one generates the basic PWM pulse, so labeled in FIG. 4, in the same manner described, for example, in U.S. Pat. Nos. 5,070,292 and 5,081,409. That is, one derives the basic PWM pulse by comparing an analog correction signal with a triangular dither signal, and generating a pulse according to whether or not the error signal exceeds the dither signal. One then generates signals A, B, C, and D in the following manner. First, assume that the basic PWM pulse is low. By definition, A is low, B is high, and C and D are low. When the basic PWM pulse goes high, the system causes D to become high immediately. (Actually, one cannot have an immediate response, but one can make the time delay between detection of the basic PWM pulse and initiation of the D pulse negligible compared to the widths of all the pulses shown. The same applies to the "immediate" responses discussed below.) One defines time $t_o$ as the time at which D becomes high. A counter then counts to time $t_1$, at which time B immediately becomes low. Then the counter counts to time $t_2$, at which time D immediately becomes low and C immediately becomes high. When the counter reaches time $t_3$, A becomes high, and when the counter reaches time $t_4$, C becomes low. When the basic PWM pulse goes from high to low, the system performs a similar function, controlling the signals A, B, C, and D by counting time intervals following the trailing edge of the basic PWM pulse.

Note that signal B, when constructed as described above, represents the complement of A, except that one has added a provision for dead time. Thus, B does not become high until some time after A has become low, and B becomes low before A becomes high.

One intends that signal C represent a relatively narrow pulse that straddles the times at which A changes state, and that signal D represent a similar narrow pulse that straddles the changes in B. Note that when C changes from high to low immediately following the trailing edge of a pulse of A, D changes immediately from low to high. When D changes from high to low immediately following the trailing edge of a pulse of B, C changes immediately from low to high. Actually, one does not require that the pulses follow each other in the above manner. Instead, for example, D may become high somewhat after C has become low, and C can become high somewhat after D has become low. One does require that A and D not assume the high condition simultaneously. Also, C and B, and A and B, should not assume the high condition at the same time.

Thus, one can derive signals A, B, C, and D directly from a basic PWM pulse received from a modulator, and this embodiment of the invention therefore does not require independent pulse trains. Note also that one can vary the widths of the pulses of C and D; the important feature resides in the fact that C is on when A turns on or off and B is on when D turns on or off. Thus, in the example of FIG. 4, the pulse of C which occurs near the leading edge of a pulse of A may begin at any time during the "dead time" before the leading edge of A, etc.

In an alternative arrangement, one can allow signal C to remain high for the entire time that A remains high. In other words, one could replace each pair of pulses of C with a long pulse which becomes high just before A becomes high, and which stays high until just after A becomes low. One could similarly modify the pulses of D. However, an advantage of using narrow pulses for signals C and D is that one may use a pulse transformer to transmit the control signals to the FETs. A pulse transformer in many cases is more economical than other isolation methods. Thus, using narrow pulses will allow a proper operation of the pulse transformer regardless of the duty cycle of the PWM signal.

In another alternative embodiment, one can replace the FETs of FIG. 3 with insulated gate bipolar transistors (IGBTs), which work like FETs but which do not have parasitic diodes. The circuit would work in the same manner as described above. However, because the IGBTs have no parasitic diodes, one would need to connect an external diode in parallel to each IGBT, similar to those shown in FIG. 1, to provide the necessary current paths.

Figure 5:
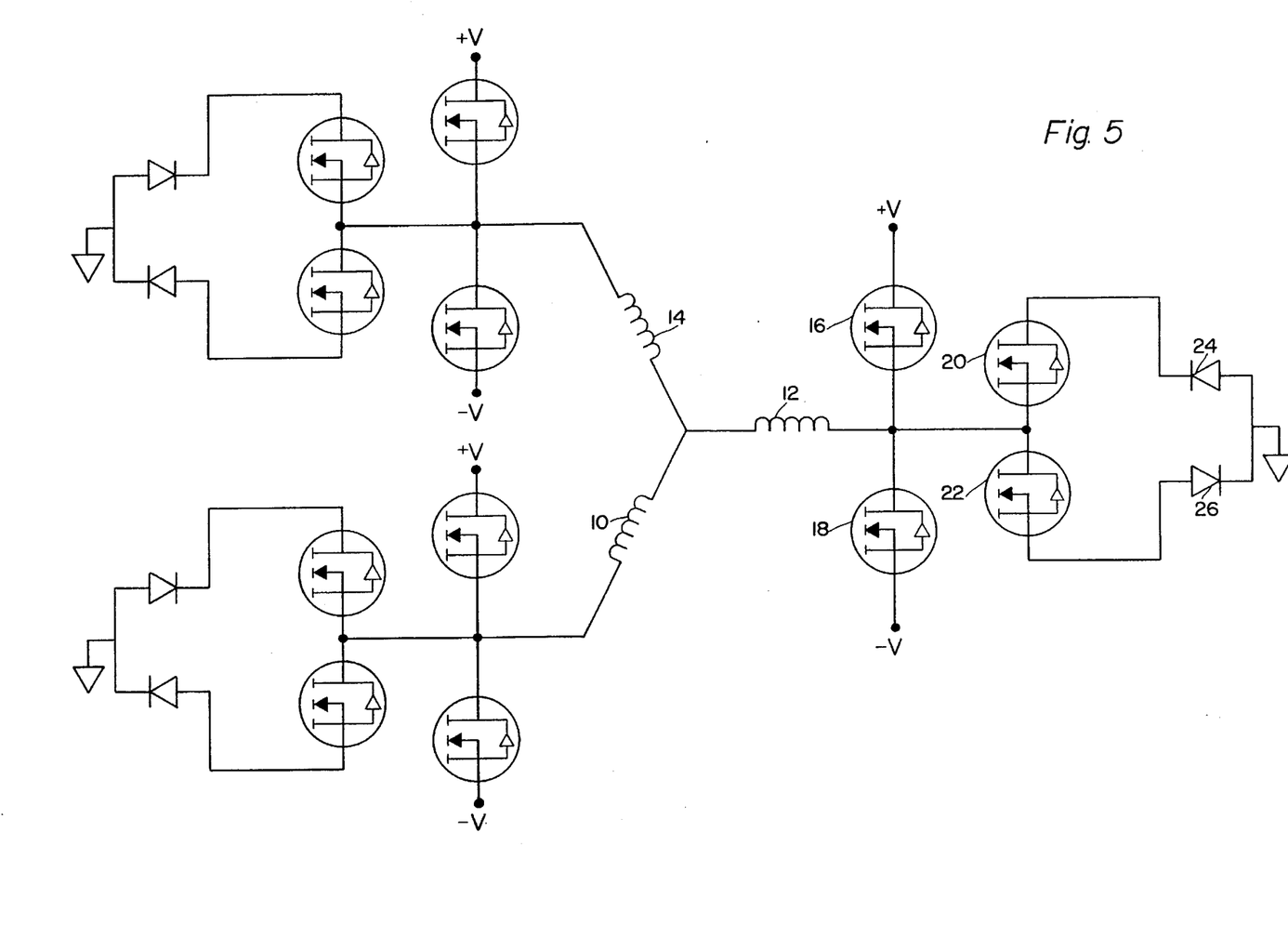
FIG. 5 shows a schematic diagram of an embodiment of the invention suitable for use with three-phase current.

FIG. 5 shows an embodiment of the invention suitable for use with three-phase current. The load includes segments 10, 12, and 14. One connects a pair of main switches 16 and 18 to load segment 12, and one connects auxiliary switches 20 and 22, and diodes 24 and 26, in the manner shown. The other load segments connect with similar main switches and auxiliary switches. The circuit operates in a manner similar to that described for the single phase case, except that one would need three sets of pulses, one for each phase.

Figure 6:
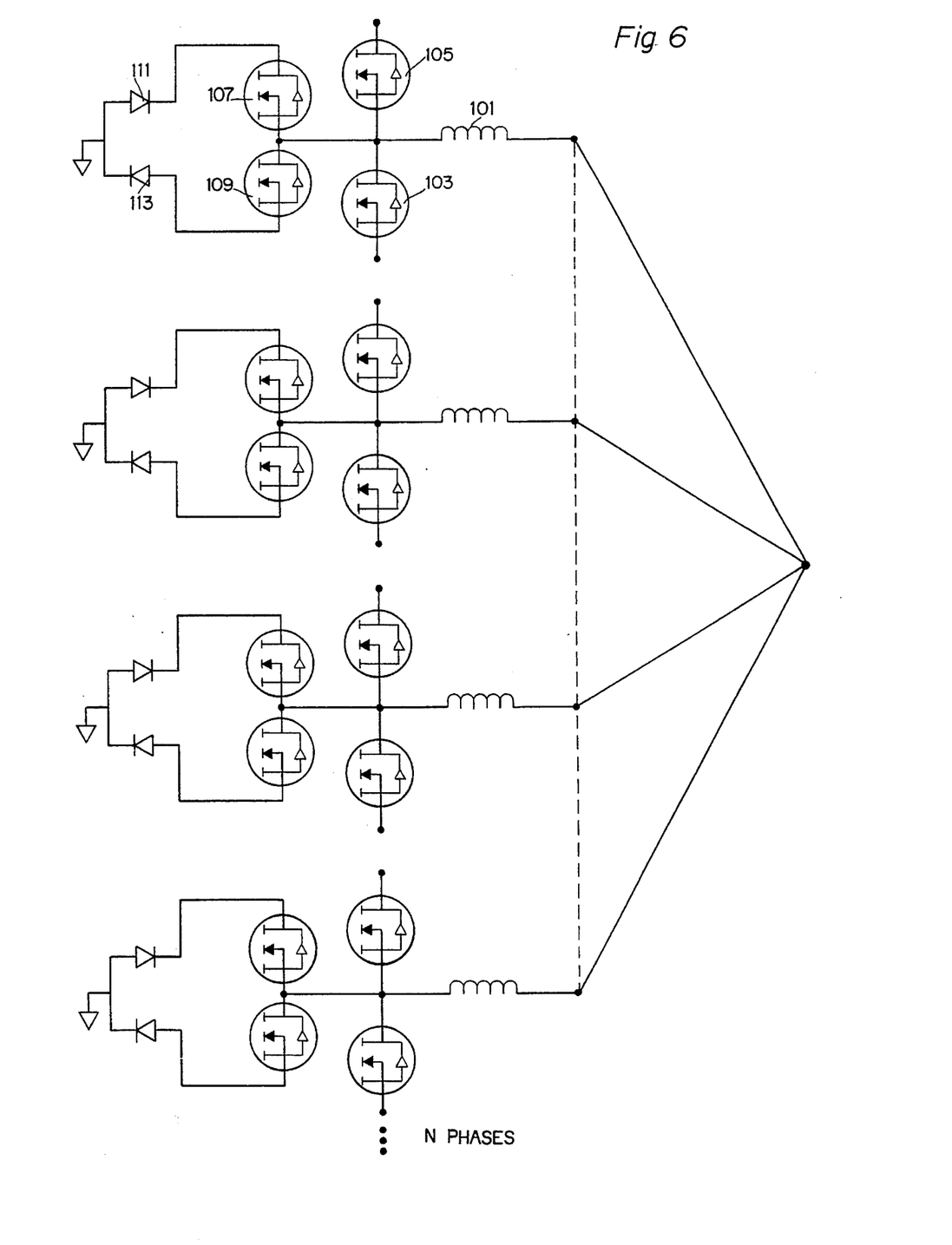
FIG. 6 shows a schematic diagram of an embodiment of the invention suitable for use with an N-phase configuration.

FIG. 6 shows another generalization of the invention. FIG. 6 represents the case of an N-phase current. The circuit includes N branches, where N is a positive integer. Each branch includes a load 101, main FETs 103 and 105, and recovery paths which include auxiliary FETs 107 and 109 connected in series with diodes 111 and 113 respectively.

In still another alternative arrangement, one can replace the H-bridge of FIG. 3 with a T-bridge configuration. In this embodiment, one would simply use one-half of the H-bridge shown in FIG. 3, connecting one side of the load to ground. Note also that the T-bridge comprises the case where N=1 in FIG. 6. Thus, in the case of the T-bridge, there are two main FETs and two auxiliary FETs, with the right-hand side of the load, as shown in FIG. 6, being connected to ground.

Figure 7:
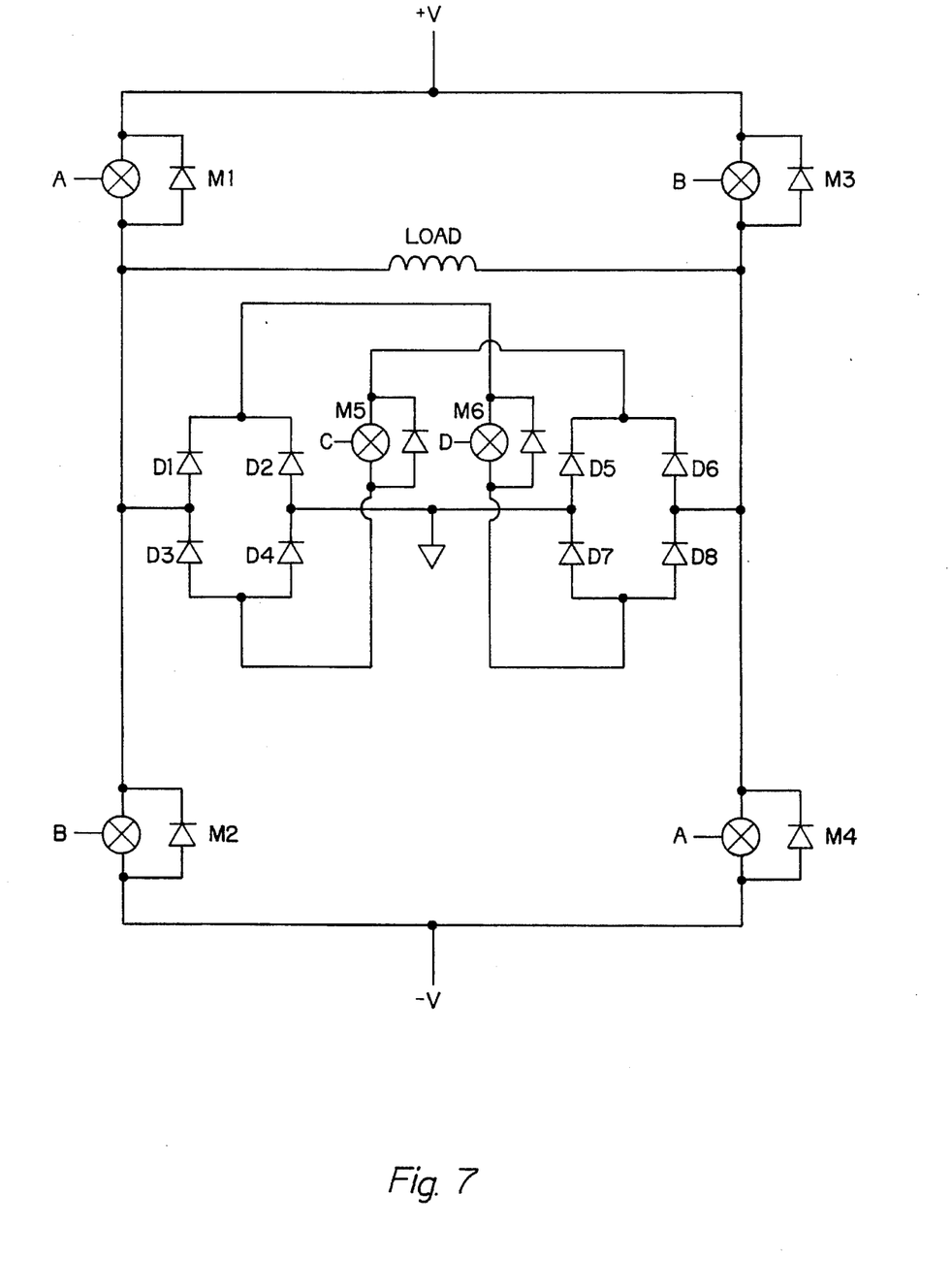
FIG. 7 shows a schematic diagram of an alternative embodiment of the invention, wherein there are only two auxiliary switches.

FIG. 7 shows an alternative embodiment which reduces the number of switches required in a PWM circuit for providing current to a load. The basic PWM circuit is defined by switches M1, M2, M3, and M4, each having diodes connected in parallel with the switches, as shown. These diodes could be the parasitic diodes associated with the switches, or they could be discrete components connected across the switches. The auxiliary switches are M5 and M6, which are used in conjunction with diodes D1 through D8. Switches M1 and M4 are controlled by PWM signal A, and switches M2 and M3 are controlled by signal B. Switch M5 is controlled by signal C and switch M6 is controlled by signal D. The signals A, B, C, and D are derived exactly as described above, and as illustrated in FIG. 4.

The operation of the circuit of FIG. 7 will now be described. Assume first that the current through the load flows in a positive direction, i.e. from left to right. When A is high, M1 and M4 conduct, and current flows from the power supply (+V), through M1, through the load, through M4, and back to the power supply (−V). When A becomes low, but while C is still high, current flows from the load, through D6, through M5, through D3, and back to the load. The latter path is a recovery path. Note that it excludes the power supply.

When C next becomes low, current flows from the power supply (−V), through M2, through the load, through M3, and back to the power supply (+V). The latter path is established not only while B is high, but also during the short periods before B becomes high and after B becomes low, while C is low. During those short periods, current flows through the parasitic or external diodes of M2 and M3.

If the current through the load flows in the negative direction, i.e. from right to left, the current paths are as follows. While A is high, and also while A is low but C is high, current flows from the power supply (−V), through M4, through the load, through M1, and back to the power supply (+V). While A is low, and C is high, current flows through the parasitic or external diodes of M1 and M4, similar to the case of positive current flow. When D is high, and while B is low, current flows from the load, through D1, through M6, through D8, and back to the load. The latter path is the recovery path for the case in which current through the load flows in the negative direction. When B is high, current flows from the power supply (−V), through M2, through the load, through M3, and back to the power supply (+V).

Note that the recovery paths do not include any of diodes D2, D4, D5, and D7. However, these diodes are necessary to compensate for the fact that any pair of switches cannot be made to turn on or off at exactly the same time, even though they are controlled by the same pulses. For example, assume that the current through the load is positive, and that signal A is high. Current flows from the power supply (+V), through M1, through the load, through M4, and back to the power supply (−V). Now assume that A becomes low, and that M4 turns off just before M1 turns off. Then, for the brief interval during which M1 is on and M4 is off, current will flow from the power supply (+V), through M1, through the load, through D6, through M5, through D4, and then to ground. By providing this path to ground, the circuit prevents the voltage at the terminals of the load from deviating from ground during the recovery period, thereby preventing excessive losses during that period. After M1 turns off, the current will flow through the recovery path as described above (i.e. from D3, through the load, through D6, through M5, and back to D3).

The above description shows the use of D4 in preventing losses when M4 turns off before M1 turns off. Diodes D2, D5, and D7 serve the same purpose in other comparable circumstances. In particular, D5 solves the same problem when M4 stays on before M1 turns off. Assuming current through the load is negative, diode D2 solves the same problem when M2 stays on before M3 turns off. And D7 solves the same problem when M3 stays on before M2 turns off.

The circuit of FIG. 7 has the advantage that it uses fewer switches than that of FIG. 3. Thus, the circuit of FIG. 7 is less expensive and less complex, and it occupies less space. While it does require more diodes, the set of diodes can usually be purchased as one package. The circuit of FIG. 7 also causes fewer losses because the recovery path involves two diodes and one switch, as compared with the two diodes and two switches of FIG. 3. On the other hand, the circuit of FIG. 7 can only be used in the H-bridge configuration.

Figure 8:
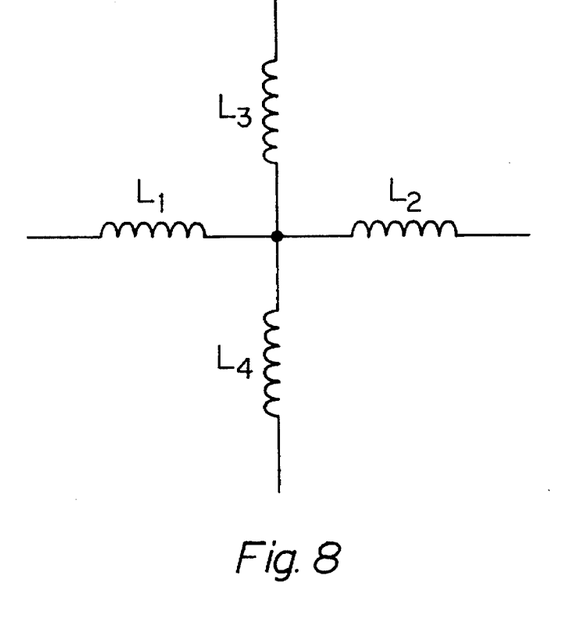
FIG. 8 shows an arrangement of inductive loads across which circuits of the type shown in FIG. 7 can be connected.

The circuit of FIG. 7 can be generalized to the case of N phases, where N is an even integer. For example, suppose that the load has the configuration shown in FIG. 8. One would connect an H-bridge circuit such as FIG. 7 across the series combination of $L_1$ and $L_2$, which would constitute one load. One would also connect a similar H-bridge circuit across the series combination of $L_3$ and $L_4$. Additional sets of inductors could be added.

Figure 9:
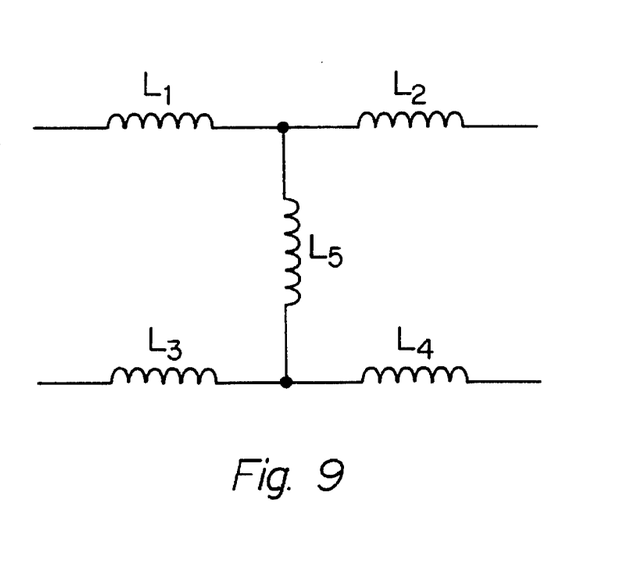
FIG. 9 shows another arrangement of inductive loads across which circuits of the type shown in FIG. 7 can be connected.

FIG. 9 shows another alternative configuration of a multiple-phased load. One could connect an H-bridge across the series combination of $L_1$, $L_5$, and $L_4$. One would connect another H-bridge across the series combination of $L_3$, $L_5$, and $L_2$.

Figure 10:
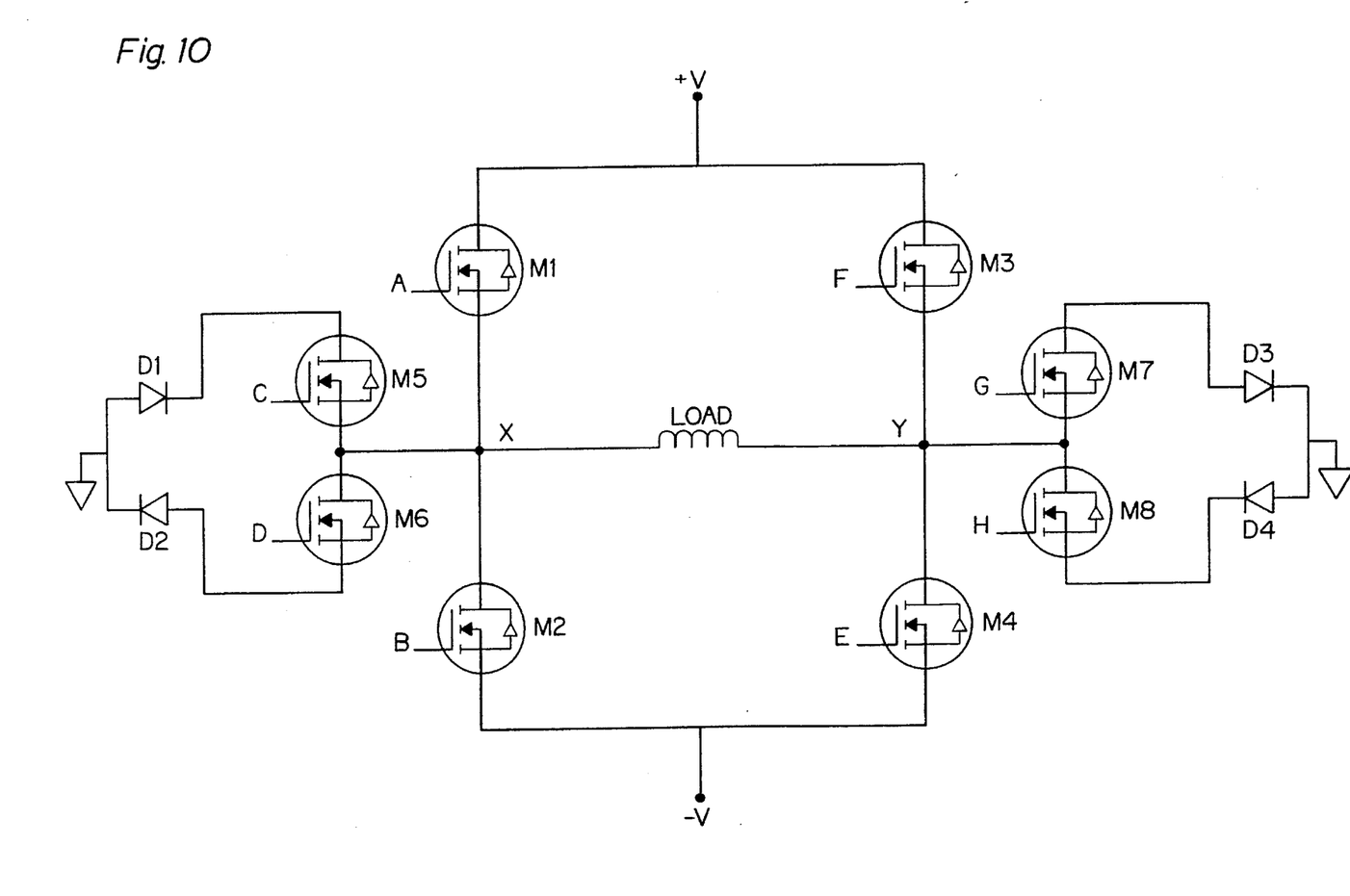
FIG. 10 is a schematic diagram similar to FIG. 3, but showing the two halves of the circuit driven by independent sets of pulses.

The circuit of FIG. 3 can also be generalized as shown in FIG. 10. FIG. 10 is similar to FIG. 3, except that switches M3, M4, M7, and M8 are driven by signals E, F, G, and H, instead of by signals A, B, C, and D. Signals E, F, G, and H are entirely independent of signals A, B, C, and D. However, signals E, F, G, and H are related to each other in the same way as signals A, B, C, and D are related to each other (i.e. as illustrated in FIG. 4). Thus, the circuit of FIG. 3 can be driven by two independent sets of pulse signals applied to opposite halves of the circuit.

The embodiment of FIG. 6 can also represent the case in which each set of switches is driven by an independent set of pulses. The embodiment shown in FIG. 10 can thus be considered a special case of the embodiment of FIG. 6, where N=2, and where the sets of pulses are independent of each other.

In the embodiments described above, the power supply has been shown as providing voltages $+V$, $-V$, and a "ground" which, by definition, is a voltage which is midway between $+V$ and $-V$. The recovery path is connected to ground in these embodiments, as shown. This power supply arrangement can be generalized, however. For example, in the embodiment of FIG. 3, instead of connecting D1 and D2 together and to ground, one could connect D1 to a source of voltage $V_1$, and one could connect D2 to a source of voltage $V_2$. In this more general case, both $V_1$ and $V_2$ would have values between $+V$ and $-V$, and $V_1$ and $V_2$ could be the same or different from each other. One could implement this arrangement by providing a suitable resistive network in the power supply to provide the voltages $V_1$ and $V_2$. Similar modifications can be made to the other embodiments described above. In general, each connection to ground could be replaced by a connection to a voltage between $+V$ and $-V$, as provided by the power supply. The invention therefore should not be considered limited to a particular arrangement of the power supply.

The reader skilled in the art will recognize that one can modify the invention in other ways. The present invention includes such modifications, within the spirit and scope of the following claims.

What is claimed is:

1. In an electronic switching circuit for providing current through a load, the circuit comprising four main electronic switches connected between a power supply and the load, a first pair of main switches being controlled by a drive circuit operated by a first pulse-width modulated (PWM) signal derived from a command signal, the second pair of main switches being controlled by a drive circuit operated by a second PWM signal which is derived from the complement of the first PWM signal, the improvement wherein the circuit includes at least one recovery path, the recovery path comprising an auxiliary switch and two primary diodes connected together in series, the recovery path comprising a circuit which includes the load and the auxiliary switch and the primary diodes and excludes the power supply, the auxiliary switch being driven by a pulse train which is derived from said first PWM signal, the auxiliary switch being independent of either of said drive circuits.

2. The improvement of claim 1, wherein the first PWM signal includes a plurality of pulses, each pulse having a leading edge and a trailing edge, and wherein the pulses which drive the auxiliary switch straddle said leading and trailing edges.

3. The improvement of claim 1, wherein the first and second PWM signals include dead times, at which there is neither a pulse present in the first PWM signal or the second PWM signal, and wherein the pulses which drive the auxiliary switch all begin or end during the dead times.

4. The improvement of claim 1, further comprising means for momentarily grounding the load when one of the switches in one of said pairs of main switches has a different state from the other switch of said pair of main switches.

5. The improvement of claim 4, wherein the grounding means comprises a plurality of secondary diodes connected in series with one of the auxiliary switches, the secondary diodes being different from the primary diodes.

6. In a method of providing current through a load, the method comprising the steps of generating a pulse-width modulated (PWM) signal from a command signal, and applying said PWM signal to a drive circuit of at least one main electronic switch connected between the load and a power supply, the improvement which comprises the step of diverting the current flowing through said main electronic switch into an auxiliary circuit path, the diversion being done either when the main switch is being turned on or off, the auxiliary circuit path including the load and excluding the power supply, the auxiliary switch being independent of the drive circuit.

7. The improvement of claim 6, wherein the diverting step comprises the step of actuating a switch located in the auxiliary circuit path.

8. The improvement of claim 6, wherein the PWM signal comprises a plurality of pulses having leading and trailing edges, and wherein the actuating step comprises the steps of providing a plurality of auxiliary pulses which straddle the leading and trailing edges of the pulses of said PWM signal, and applying the auxiliary pulses to an auxiliary switch in the auxiliary circuit path.

9. The improvement of claim 6, wherein there are a pair of main switches connected to be controlled by the same PWM signal, the method further comprising the step of momentarily grounding the load when one of the switches of said pair of main switches has a different state from the other switch of said pair.

10. Apparatus for providing current through an N-phase load, where N is a positive integer, the apparatus comprising:

a) means for generating a series of main pulses, the width of each pulse in the series being related to the instantaneous magnitude of an analog signal, b) a pair of main electronic switches associated with each phase of the load, each pair of main electronic switches connected to be controlled by the main pulses, each of the switches being connected between the load and a power supply, c) a pair of recovery paths associated with each phase of the load, each recovery path comprising an auxiliary electronic switch and a diode connected in series, each recovery path defining two ends, one end being connected to the load and the other end being connected to the power supply, and d) means for actuating the switches in the recovery paths, the actuating means including a series of auxiliary pulses, the auxiliary pulses being related to the main pulses, wherein the main pulses have leading and trailing edges, and wherein each auxiliary pulse straddles a leading or a trailing edge of one of said main pulses, wherein the main pulses are independent of each other.

11. The apparatus of claim 10, wherein the main pulses and the auxiliary pulses are derived from a basic PWM signal, the basic PWM signal being obtained by comparing an error signal with a triangular dither signal.

12. Apparatus for providing a current through a load, the apparatus comprising:

a) means for generating a series of main pulses, the width of each pulse in the series being derived from the instantaneous magnitude of an analog signal, b) four main electronic switches, each connected to be controlled by the main pulses, each of the switches being connected between the load and a power supply, c) four recovery paths, each recovery path comprising an auxiliary electronic switch and a diode connected in series, each recovery path defining two ends, one end being connected to the load and the other end being connected to the power supply, and d) means for actuating the switches in the recovery paths, the actuating means including a series of auxiliary pulses, the auxiliary pulses being derived from the main pulses, wherein the main pulses have leading and trailing edges, and wherein each auxiliary pulse straddles a leading or a trailing edge of one of said main pulses, wherein there are two series of main pulses, and wherein the two series of main pulses are independent of each other, and wherein one series of main pulses controls at least one of the main electronic switches, and wherein the other series of main pulses controls at least one of the other main electronic switches.

* * * * *